United States Patent Office 3,764,355
Patented Oct. 9, 1973

3,764,355
STABILIZATION OF POSITIVE SOL-REFRACTORY
GRAIN SLURRIES
Earl P. Moore, Jr., Wilmington, Del., assignor to E. I. du
Pont de Nemours and Company, Wilmington, Del.
No Drawing. Filed May 20, 1971, Ser. No. 145,534
Int. Cl. C04b 35/48
U.S. Cl. 106—57                                11 Claims

ABSTRACT OF THE DISCLOSURE

Slurries of refractory material such as molochite suspended in aqueous sols of positively charged alumina coated colloidal silica particles are stabilized by the addition of certain acids, particularly hydroxy substituted organic acids such as hydroxyacetic acid.

BACKGROUND OF THE INVENTION

Slurries of refractory material suspended in aqueous sols of positively charged silica particles coated with alumina are useful in a rapid process for making precision investment casting molds and other ceramic laminates. This process is described in detail in commonly assigned application Ser. No. 49,916. Briefly, laminates are built up on a pattern by alternately dipping the pattern in reagents containing oppositely charged materials such as a sol of positively charged particles followed by a sol of negatively charged particles. To increase the rate of buildup and impart the desired properties to the ceramic article, refractory material is slurried in the reagent containing the charged particles. Slurries of refractory grain and refractory fibrous material suspended in aqueous sols of positively charged alumina coated colloidal silica are particularly useful in this process. However, these slurries tend to thicken on standing and their maximum working life is only about six to eight days. This invention provides stabilizing agents with which the working life of these slurries can be extended to 25 days or more.

SUMMARY OF THE INVENTION

The working life of slurries of up to 80% by weight particulate or fibrous refractory material suspended in aqueous sols of positively charged alumina coated colloidal silica can be extended by the addition of a stabilizer. Stabilizers useful for extending the life of these slurries are water soluble hydroxy-substituted aliphatic and aromatic carboxylic acids as well as some mineral acids such as phosphoric acid and certain other organic acids such as ethylenediaminetetraacetic acid and nitrilotriacetic acid. Addition of from 0.00834 to 0.0834 part by weight of stabilizer per part of colloidal solids provides the improved stability in the slurries of this invention.

In particular, this invention is directed to the use of stabilizing agents such as hydroxyacetic acid, citric acid, maleic acid, tartaric acid, gluconic acid, diglycolic acid, phosphoric acid, ethylenediaminetetraacetic acid and nitrilotriacetic acid. The last two stabilizing agents named, polyfunctional carboxylic acids, must be partially converted to salts to adjust their water solubility so that useful amounts may be dissolved in the slurries of this invention.

DESCRIPTION OF THE PREFERRED EMBODIMENTS

The inventtion will now be described in detail with particular reference to the elements of the stabilized slurries of this invention.

Positive sols

This invention utilizes acidic sols of positively charged colloidal particles which are composed of a silica core coated with alumina. Such sols are referred to herein as positive sols. Sols of this type are described in U.S. Pat. 3,007,878.

An example of a charged alumina-coated silica sol which is particularly useful in this invention is one in which there is one mole of aluminum per mole of surface silica and which is prepared by a process described as follows:

264 lbs. of "Ludox" HS colloidal silica containing 40% $SiO_2$ by weight, the silica particles having an average particle size of 12–15 millimicrons and a specific surface area of about 215 m.$^2$/g. $SiO_2$, is adjusted to pH 7.50 with 821 grams of a 1:1 mixture of concentrated hydrochloric acid and water. The sol is mixed with 62.8 lbs. of 50% chlorohydrol ($Al_2(OH)_5Cl$) and 61.7 lbs. of water by introducing it at a rate of 25 lbs./minute into a centrifugal pump circulating the basic aluminum chloride solution. The clear fluid intermediate product is heated to 60° C. in one-half hour and at 60° C. for two hours, cooled to 20° C., and stirred with a Lightnin® mixer as well as circulated with the pump as 600 grams magnesium hydroxide dispersed in 1800 grams water is introduced in 5 minutes to bring the pH to 5.65. Agitation and circulation are continued for 2 hours. The clear stable product contains 26.4% $SiO_2$, 4.2% $Al_2O_3$, 1.5% Cl and 0.23% MgO. The mole ratio of aluminum to surface $SiO_2$ is 1:1. The pH of the product after several weeks ageing is 4.60, the viscosity is 16 cps., and the specific gravity at 25° C. is 1.23. This product (referred to hereinafter as Positive Sol 130M), is the positive sol which is used in the examples set forth hereinbelow.

Positive Sol 130M is stabilized by chloride ion. As described in U.S. 3,007,878 other anions, such as formate, acetate, lactate, nitrate, bromide, perchlorate, bromate, and trichloroacetate, can be used instead of chloride.

Refractory material

Several types of refractory material may be used in the slurries of this invention. Any finely divided particulate or fibrous refractory material may be used provided that it does not react with the positive sol. Among the suitable granular refractory materials are zircon, aluminosilicates such as mullite, sillimanite and molochite, fused silica and alumina. Useful refractory fibers are Kaowool®, volcanic rock fibers, glass fibers, and Fiberfrax®, aluminosilicate fibers. Slurries of these refractory materials are prepared as described in U.S. patent application Ser. No. 49,916. The slurries of this invention contain from up to 80% by weight of particulate refractory material based on the total weight of the slurry.

Stabilizing agents

The stabilizing agents useful for prolonging the working life of the slurries of this invention are generally hydroxy-substituted aliphatic and aromatic carboxylic acids as well as other acids such as phosphoric acid, ethylenediaminetetraacetic acid and nitrilotriacetic acid. The apparent chemical function of the stabilizing agents is to complex with ionic impurities introduced into the slurry with the refractory material which have a destabilizing effect on the positive sol. The use of the stabilizing agents in the particulate refractory-positive sol slurries extends their working life from 6–8 days to as much as 25 days or more. Without addition of these stabilizing agents the slurries tend to thicken and become unuseable in about 6–8 days. The stabilizing agents most useful in this invention are hydroxyacetic acid, citric acid, maleic acid, tartaric acid, gluconic acid, diglycolic acid, phosphoric acid, ethylenediaminetetraacetic acid and nitrilotriacetic acid. These last two stabilizing agents require partial conversion to the salt of the orgaic acid in order to reach a solubility level adequate for use in the slurries of this invention. For example, the nitrilotriacetc acid should be adjusted to pH of approximately 3.3 with sodium hydroxide. The ethylenediaminetetraacetic acid is best used as the disodium salt. The most preferred stabilizing agents are hydroxyacetic acid and citric acid. Mixtures of these two stabilizing agents are also highly preferred.

The useful limits of stabilizing agents in the slurry of this invention appear to be about a quarter of a gram per 100 grams of a 30% colloidal solids positive sol at the lower limit and approximately ten times as much, 2½ grams per 100 grams of 30% solids positive sol at the upper limit. This translates to from 0.00834 to 0.0834 parts by weight of the stabilizer per part of colloidal solids. The preferred stabilizer range is from 0.017 to 0.05 parts by weight of stabilizer per part of coloidal solids. Not all of these stabilizing agents are effective over the entire range set out. Some of the acids cause positive sol to gel at the higher concentrations. However, all of the stabilizing agents are operative within the range described and the optimum level for any particular agent is easily determined. Some of the stabilizers can be used at even higher concentrations with no ill effect, but no advantage is obtained thereby.

The following examples further illustrate this invention.

EXAMPLES

In the following examples the indicated stabilizing agents were added in the amounts shown to a slurry of 1250 g. Positive Sol 130M (30% solids) and 2150 g. molochite 200 mesh refractory grain.

0.0834 parts by weight of said stabilizer per part of colloidal particles.

3. The slurry of claim 2 containing from 0.0167 to 0.050 parts by weight of said stabilizer per part of colloidal particles.

4. The slurry of claim 1 wherein the stabilizer is hydroxyacetic acid.

5. The slurry of claim 1 wherein the stabilizer is citric acid.

6. The slurry of claim 1 wherein the stabilizer is a mixture of hydroxyacetic acid and citric acid.

7. The slurry of claim 2 wherein the stabilizer is hydroxyacetic acid.

8. The slurry of claim 2 wherein the stabilizer is citric acid.

9. The slurry of claim 2 wherein the stabilizer is a mixture of citric acid and hydroxyacetic acid.

10. A process for stabilizing slurries of from up to 80% particulate refractory material suspended in an aqueous sol of positively charged colloidal silica particles coated with alumina comprising adding from 0.00834 to 0.0834 parts by weight of a stabilizer per part of colloidal particles, said stabilizer being a complexing agent selected from the group consisting of hydroxyacetic acid, citric acid, maleic acid, tartaric acid, gluconic acid, diglycolic acid, ethylenediaminetetraacetic acid and nitrilotriacetic acid.

11. The slurry of claim 3 wherein the stabilizer is hydroxyacetic acid, citric acid or a mixture thereof.

| Example No. | Stabilizing agent | Amount added Gram | Parts/part colloidal solids | Slurry life, days | Final pH of slurry |
|---|---|---|---|---|---|
| 1 | | | | 6–8 | 4.2–4.5 |
| 2 | Hydroxyacetic acid | 4.375 | 0.01167 | 6 | 4.15 |
| 3 | do | 8.75 | 0.0233 | 7 | 4.0 |
| 4 | do | 17.5 | 0.0466 | 24 | 3.85 |
| 5 | Citric acid | 3.125 | 0.00834 | 8 | 4.35 |
| 6 | do | 6.25 | 0.0167 | 12 | 4.15 |
| 7 | do | 9.375 | 0.025 | 24 | 4.03 |
| 8 | Hydroxyacetic acid-citric acid | 3.125–9.375 | 0.00834–0.025 | 24 | 3.90 |
| 9 | do | 6.25–6.25 | 0.0167–0.0167 | 20 | 3.72 |
| 10 | do | 6.25–9.375 | 0.0167–0.025 | >27 | 4.05 |
| 11 | Maleic acid | 6.25 | 0.0167 | 9 | 4.24 |
| 12 | Tartaric acid | 6.25 | 0.0167 | 9 | 4.15 |
| 13 | Gluconic acid | 12.5 | 0.033 | 12 | 4.21 |
| 14 | Diglycolic acid | 12.5 | 0.033 | 14 | 3.75 |
| 15 | Phosphoric acid | 8.125 | 0.0216 | 11 | 4.25 |
| 16 | Ethylenediaminetetraacetic acid-disodium | 6.25 | 0.0167 | 10 | 4.52 |
| 17 | Nitrilotriacetic acid (pH adjusted to 3.3) | 6.25 | 0.0167 | 14 | 4.65 |

What is claimed is:

1. A slurry of up to 80% by weight refractory material suspended in an aqueous sol of positively charged colloidal silica particles coated with alumina containing a stabilizer for extending the workng life of the slurry, said stabilizer being a complexing agent selected from the group consisting of hydroxyacetic acid, citric acid, maleic acid, tartaric acid, gluconic acid, diglycolic acid, ethylenediaminetetraacetic acid and nitrilotriacetic acid.

2. The slurry of claim 1 containing from 0.00834 to

References Cited
UNITED STATES PATENTS

| | | | |
|---|---|---|---|
| 3,242,095 | 3/1966 | O'Connor | 252—313 R |
| 3,252,917 | 5/1966 | Mindick et al. | 252—313 S |
| 3,445,250 | 5/1969 | Preece | 106—69 |
| 3,507,944 | 4/1970 | Moore | 106—57 |

JAMES E. POER, Primary Examiner

U.S. Cl. X.R.

106—65, 67, 69